(12) United States Patent
Noble et al.

(10) Patent No.: US 7,603,154 B2
(45) Date of Patent: Oct. 13, 2009

(54) NON-INVASIVE LEFT VENTRICULAR VOLUME DETERMINATION

(75) Inventors: Nicholas Michael Ian Noble, London (GB); Marcel Breeuwer, Eindhoven (NL)

(73) Assignee: Koninklijke Philips Electronics N.v., Eindhoven (NL)

( * ) Notice: Subject to any disclaimer, the term of this patent is extended or adjusted under 35 U.S.C. 154(b) by 85 days.

(21) Appl. No.: 10/554,021

(22) PCT Filed: Apr. 23, 2004

(86) PCT No.: PCT/IB2004/050503

§ 371 (c)(1),
(2), (4) Date: Oct. 21, 2005

(87) PCT Pub. No.: WO2004/097720

PCT Pub. Date: Nov. 11, 2004

(65) Prior Publication Data

US 2006/0241376 A1    Oct. 26, 2006

(30) Foreign Application Priority Data

Apr. 24, 2003    (EP) .................................. 03101141

(51) Int. Cl.
*A61B 5/05* (2006.01)
*A61B 8/00* (2006.01)
*G06K 9/46* (2006.01)

(52) U.S. Cl. ........................ 600/407; 600/410; 600/425; 600/437; 382/128

(58) Field of Classification Search ................ 600/407, 600/454, 419
See application file for complete search history.

(56) References Cited

U.S. PATENT DOCUMENTS

| 5,107,838 A | | 4/1992 | Yamaguchi |
| 5,185,809 A | | 2/1993 | Kennedy et al. |
| 5,195,521 A | * | 3/1993 | Melton et al. ............... 600/438 |
| 5,433,199 A | | 7/1995 | Cline et al. |

(Continued)

FOREIGN PATENT DOCUMENTS

EP    0521559 A1    1/1993

(Continued)

OTHER PUBLICATIONS

Wei Li, MD et al. Dark Flow Artifacts with Steady-State Free Precession Cine MR Technique: Causes and Implications for Cardiac MR Imaging. Radiology 2004; 230:569-575. <http://radiology.rsnajnls.org/cgi/content/full/230/2/569>.*

(Continued)

*Primary Examiner*—Eric F Winakur
*Assistant Examiner*—Helene Bor

(57) ABSTRACT

A method for calculating total left ventricular (LV) volume during a cardiac cycle includes estimating the LV volume using only endocardial contours in a cardiac 3D image that was acquired at end diastole (ED), i.e. the moment at which the heart is fully relaxed. These contours are manually specified or (semi-)automatically derived. Based on these contours and on the pixel intensity in all other images, the LV volume is estimated based on intensity variations within the area enclosed by the contours (ED LV blood pool). These variations are proportional to the change in size of the ventricle. Hence ventricle volume and other derivable cardiac functionality parameters as well as the phase in the cardiac cycle are derived.

18 Claims, 10 Drawing Sheets

U.S. PATENT DOCUMENTS

| | | | |
|---|---|---|---|
| 5,435,310 A | 7/1995 | Sheehan et al. | |
| 5,722,405 A * | 3/1998 | Goldberg | 600/407 |
| 5,797,396 A * | 8/1998 | Geiser et al. | 600/407 |
| 6,121,775 A * | 9/2000 | Pearlman | 324/309 |
| 6,288,539 B1 | 9/2001 | Ellis | |
| 6,438,403 B1 | 8/2002 | Cline et al. | |
| 6,537,221 B2 * | 3/2003 | Criton et al. | 600/454 |
| 6,628,743 B1 * | 9/2003 | Drummond et al. | 378/8 |
| 6,708,055 B2 * | 3/2004 | Geiser et al. | 600/425 |
| 6,961,454 B2 * | 11/2005 | Jolly | 382/131 |
| 6,980,682 B1 * | 12/2005 | Avinash et al. | 382/131 |
| 6,994,673 B2 * | 2/2006 | Lysyansky et al. | 600/443 |
| 7,047,061 B2 * | 5/2006 | Breeuwer | 600/410 |
| 7,079,674 B2 * | 7/2006 | Paragios et al. | 382/128 |
| 7,113,623 B2 * | 9/2006 | Chen et al. | 382/128 |
| 2002/0072670 A1 * | 6/2002 | Chenal et al. | 600/449 |
| 2002/0072672 A1 | 6/2002 | Roundhill et al. | |
| 2002/0072674 A1 * | 6/2002 | Criton et al. | 600/454 |
| 2002/0151793 A1 | 10/2002 | Geiser et al. | |
| 2003/0053667 A1 * | 3/2003 | Paragios et al. | 382/128 |
| 2003/0069494 A1 * | 4/2003 | Jolly | 600/410 |
| 2004/0087850 A1 * | 5/2004 | Okerlund et al. | 600/407 |
| 2004/0132006 A1 * | 7/2004 | O'Donnell et al. | 435/4 |
| 2005/0033143 A1 * | 2/2005 | O'Donnell et al. | 600/407 |
| 2005/0080328 A1 * | 4/2005 | Vass et al. | 600/407 |
| 2005/0197568 A1 * | 9/2005 | Vass et al. | 600/426 |
| 2005/0238215 A1 * | 10/2005 | Jolly et al. | 382/128 |

FOREIGN PATENT DOCUMENTS

| | | |
|---|---|---|
| EP | 0747004 A2 | 11/1996 |
| WO | 0101859 A1 | 1/2001 |
| WO | 2004097720 A1 | 11/2004 |

OTHER PUBLICATIONS

M. Breeuwer, M. Quist, L. Spreeuwers, I. Paetsch, N. Al-Saadi and E. Nagel, "Towards automatic quantitative analysis of cardiac MR perfusion images", Proceedings CARS 2001, Jun. 2001, Berlin, Germany.

http://www.lumc.nl/1010/LKEBHome/english/res...onMRIMSCT/LKEBMRICardiacFunctionMRIMSCT.html, Leiden University Medical Center: Radiology; LKEB, Research.

* cited by examiner

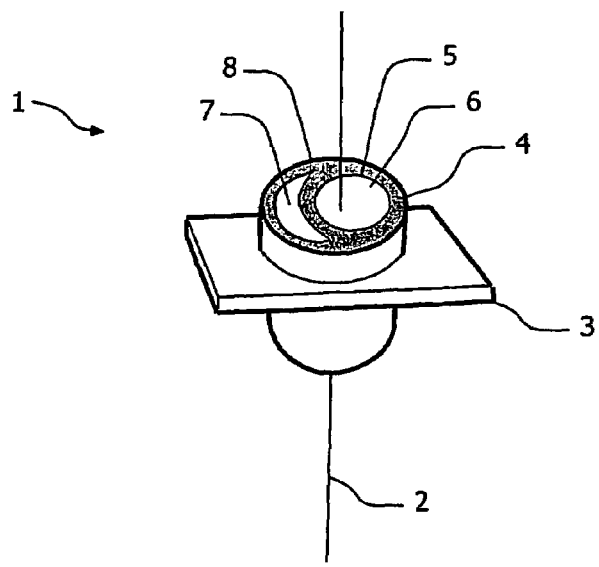
FIG.1
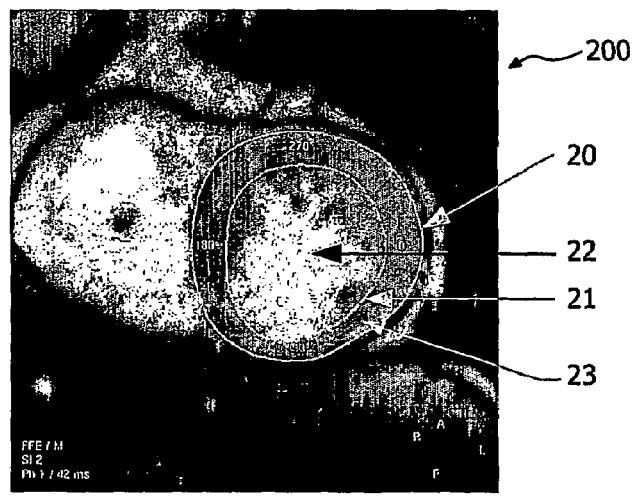 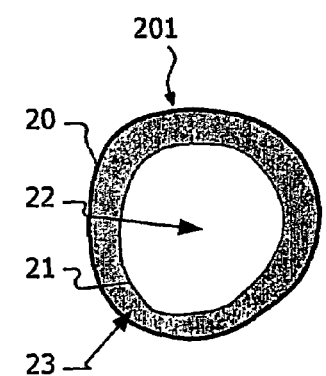
FIG.2A  FIG.2B

NON-INVASIVE LEFT VENTRICULAR VOLUME DETERMINATION

This invention pertains in general to the field of four dimensional image analyses and more particularly to the analysis of a cine sequence of captured cardiac images and even more particularly to left ventricular volume determination from a cine sequence of captured cardiac images.

The assessment of the blood volume of the left ventricle (LV) of the heart as a function of time is of importance for the evaluation of the pump function of the heart. Magnetic Resonance Imaging (MRI) is more and more getting accepted as the golden standard for this volume assessment because of its superior spatial-temporal and 'anatomical' resolution. Magnetic (MRI) is an imaging technique used primarily in medical settings to produce high quality images of the inside of the human body. MRI is based on the principles of nuclear magnetic resonance (NMR) and has advanced to a volume imaging technique. Slices having a defined slice thickness are composed of several volume elements or voxels. The volume of a voxel is calculated as the inplane resolution within the slice, e.g. 3 mm$^2$, multiplied with the through-plane resolution, i.e. the slice distance, e.g. 3 mm, which results in a voxel volume of 3 mm$^3$ for the given example. The magnetic resonance image is composed of several picture elements called pixels. The intensity of a pixel is proportional to the NMR signal intensity of the contents of the corresponding volume element or voxel of the object being imaged.

A short-axis study of the heart consists of multiple slices covering a certain portion of the heart and multiple phases within the cardiac cycle. The study is captured by means of a device for imaging inside parts of a mammal body, such as e.g. Magnetic Resonance (MR), Computer Tomography (CT), Ultrasound (US) or Nuclear Medicine (NM) devices. The sequence of images is available for further analysis.

For the assessment of LV volume the left and right ventricle are covered from apex (bottom) to base (valvular plane) in such a study. Thus four-dimensional images of the heart are available. Multiple slices (approximately 10 to 15) compose a three dimensional image of the heart. The fourth dimension is time. A full cardiac contraction cycle, i.e. one heartbeat from end-diastole (heart fully relaxed, ED) to end-systole (heart fully contracted, ES) and back to ED, is typically obtained at approximately 20 phases in the cardiac cycle.

The approach that is generally taken to measure the LV volume from MR images consists of two steps. First the endocardial contours, i.e. the inner myocardium boundaries, are delineated in all MR images of a MR cardiac study, usually short-axis slices. The myocardium is the heart's muscular wall. It contracts to pump blood out of the heart, then relaxes as the heart refills with returning blood. Its outer surface is called the epicardium and its inner lining is called the endocardium. Thereafter the LV volume is calculated on the basis of the area within the contour and knowledge about the slice distance and thus the voxel volume.

Several methods for automatic delineation of the LV endocardial contours have been proposed. However, so far none of these can perform a true automatic delineation, since the clinical user has to perform a significant number of manual contour corrections. In the presence of papillary muscles and trabeculae, at apical positions in the myocardium or when delineating the ES phase, spurious results are produced by the methods according to the prior art. The vast amount of clinician time is required to perform a set of delineations on a typical MRI cine series, i.e. approximately 400 delineations per series or several hours of manual work. For instance 20 phases times 10 slices times 2 contours=400 contours times 10 sec per contour=1 hour and 11 minutes; in reality however this may have to be done for 4-5 stress levels, so the total time can be up to 5 hours. This time constraint is prohibitive to the routine incorporation of manual delineation in LV volume determination.

Another method of determining LV volume is disclosed in U.S. Pat. No. 6,438,403 B1. A seed voxel is within the image area of the LV chamber is identified and the intensity values of neighbouring voxels are compared to a threshold to determine whether the voxel corresponds to blood or muscle tissue. For each neighbour voxel corresponding to blood, its neighbour voxels are identified and compared to the threshold, whereby this process is repeated until a pre-established spatial boundary is encountered or the number of new neighbour voxels indicates that processing is migrating into an adjacent cardiac chamber. The number of identified blood voxels is used for calculating ventricular volume. A large number of voxels has to be compared to neighbouring voxels. This method is complicated and demanding with regard to computational power. Depending on the power of the computer equipment used to perform the calculations, it takes either a long time to get a calculated result or if fast equipment is used, this means that it is expensive in terms of money to carry out the calculation. Another drawback of this method is the fact that a seed voxel has to be identified either manually or automatically, which in both cases is prone to errors. Furthermore the method of seeded region growing has the general disadvantage that it can only detect the volume in which the seed is positioned. If, for example, due to the specific geometry of the papillary muscles the LV volume consists of two non-connected sub-volumes one of the two may be missed and the LV volume calculated according to the method of U.S. Pat. No. 6,438,403 B1 is not correct.

One object of the invention is a reliable way of non-invasively determining LV volume during a cardiac cycle. Another object is to provide a method being less computational demanding than the prior art methods, so that results are faster available.

The present invention overcomes the above-identified deficiencies in the art and solves at least the above identified problems by providing a method and a computer readable medium comprising a computer program according to the appended patent claims.

The general solution according to the invention is to estimate LV volume using only endocardial contours in the 3D image that was acquired at end diastole (ED), i.e. the moment at which the heart is fully relaxed. These contours may be manually specified or (semi-)automatically derived. Based on these contours and on the pixel intensity in all other images, the LV volume is estimated.

More particularly, the image based LV volume determination method according to the invention is based on intensity variations within the cine series. The theory behind this is based on the following:

The signal intensity of blood is approximately constant through out the cardiac cycle independently of the imaging method used for acquiring the images, such as e.g. MR, CT, US, NM.

The intensity of blood significantly differs from that of the myocardium; for CT and MR blood is brighter than the myocardial tissue and the blood intensity is very strong, much stronger than that of myocardium or lung tissue, and of comparable intensity to any epicardial fat that may be present. In US and NM blood is usually dark and the myocardial tissue is brighter. Thus there is an intensity contrast between myocardial tissue and blood, independently from the imaging device/method used.

Changes in the histogram across the cardiac cycle are dominated by the strong signal coming from the blood in the ventricles as they change size.

This change is proportional to the change in size of the ventricles, this measure provides hence a way for determining the ventricle volume and other derivable cardiac functionality parameters as well as the phase in the cardiac cycle.

According to aspects of the invention, a method and a computer-readable medium for determining total left ventricular (LV) volume during a cardiac cycle from a by means of a device for imaging inside parts of a mammal body captured cine series of cardiac images are disclosed. Preferably the device for imaging inside parts of a mammal body are a Magnetic Resonance (MR), Computer Tomography (CT) or Nuclear Medicine (NM) modality or a Ultrasound (US) Device.

According to one aspect of the invention, a method is provided, wherein the method determines total left ventricular (LV) volume during a cardiac cycle from a cardiac cine series. The method comprises the steps of delineating endocardial and epicardial contours of a left ventricle in all slices of the cardiac cine series at end-diastole (ED) and subsequently applying these endocardial contours, which were delineated at ED, to all phases of the cardiac cycle, and calculating the total LV volume based on intensity values inside these endocardial contours delineated at ED.

According to another aspect of the invention, a computer-readable medium having embodied thereon a computer program for processing by a computer for calculating total left ventricular (LV) volume during a cardiac cycle from a cardiac cine series is provided. The computer program comprises a first code segment for delineating endocardial and epicardial contours of a left ventricle in all slices of a cardiac cine series at end-diastole (ED), a second code segment for applying the endocardial contours delineated at ED to all phases of the cardiac cycle, and a third code segment for calculating the total LV volume based on intensity values inside the endocardial contours delineated at ED.

The present invention has the advantage over the prior art that it provides a reliable non-invasive fast evaluation of LV volume during cardiac cycles. Furthermore the determination of LV volume according to the invention is highly accurate and reproducible.

Further objects, features and advantages of the invention will become apparent from the following description of embodiments of the present invention, reference being made to the accompanying drawings, in which FIG. 1 is a perspective view schematically illustrating the term "short axis";

FIG. 2A is a cardiac MR image showing delineated endo- and epicardial walls of the LV myocardium in ED;

FIG. 2B is a schematic illustration of FIG. 2A;

FIGS. 8-1 to 8-5 show a set of graphs illustrating the variation of LV volume in different MR slices during a cardiac cycle calculated according to the method of the invention for six patients compared to manual delineated calculation of the whole sequence.

Figure 5:
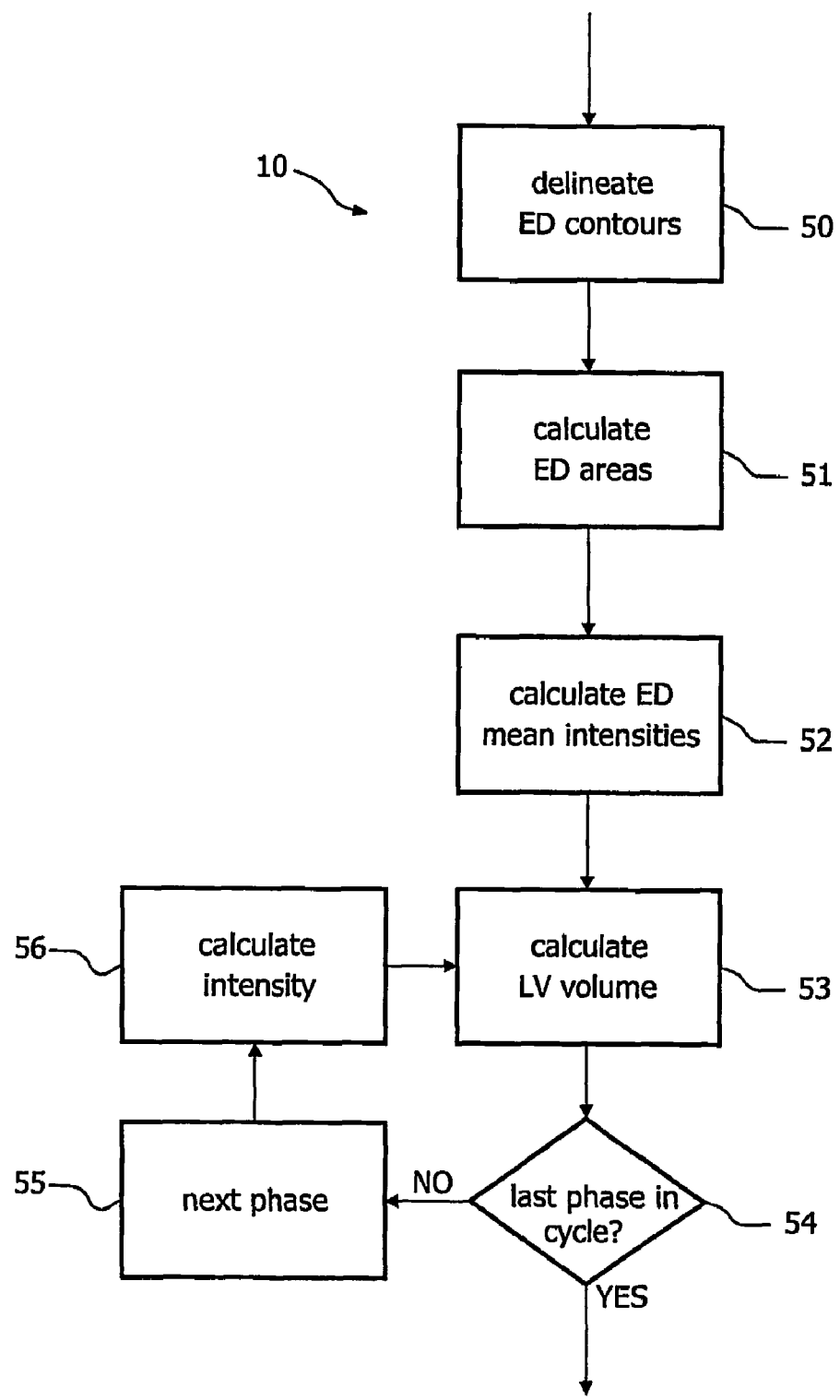
FIG. 5 is a flow chart illustrating an embodiment of the method according to the invention.
Figures 1, 8:
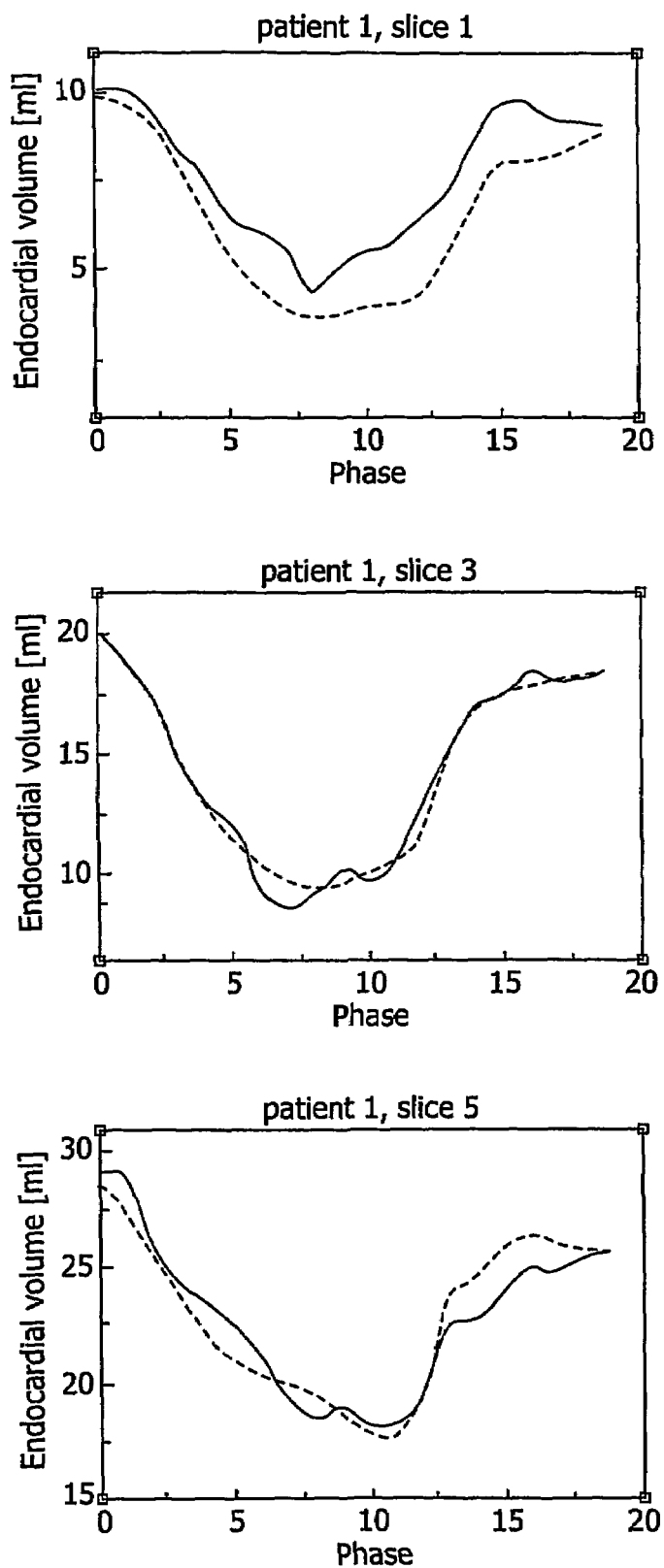

In an embodiment of the invention according to FIG. 5, a method 10 is shown. According to the method 10, the LV volume is calculated over a cardiac cycle by evaluating a short-axis MRI cine series of the heart consisting of multiple slices covering the whole heart and multiple phases within the cardiac cycle. The MRI cine series of the cardiac cycle is not limited to MRI cine series and the MRI cine series of the embodiment as described herein is not limiting. Moreover the method according to the invention may determine LV volume from any cardiac cine series, independently from the method or device by means of which the cardiac cine series is captured. The definition of a short-axis slice is illustrated in FIG. 1, wherein a long axis 2 and a short-axis slice 3 are shown. Furthermore the schematic illustration of cardiac components 1 shows the left ventricle 6, the right ventricle 7, the myocardium 4, the epicardium 8 and the endocardium 5.

It is assumed in the method that the first image in a MRI cine series corresponds to the ED phase in the cardiac cycle. This assumption is not true for all of the image sets that are used; the first image is however at most two images away from the ED phase. The ED phase being defined here as the phase at which the in-slice volume contained by a manually created endocardial contour is greatest. In case the ED image is at another position of the cine sequence, a simple re-ordering of the images can be done so that it becomes the first image.

Following this assumption, the blood volume at any subsequent phase in the cardiac cycle will be less than the blood volume at ED. Manual observation of the heart shows a tendency for the epicardial contour, i.e. the outer boundaries of the myocardium, to stay relatively fixed throughout the cardiac cycle, and the endocardial surface to move inwards, approximately towards the centroid of the left ventricular blood pool, as it approaches ES. This can be seen in the exemplary image sequence shown in FIGS. 4A-4B.

Endocardial delineation performed at ED will thus contain the LV blood pool for all slices, when the ED endocardial delineation is copied onto all subsequent phases. It is also, due to the relatively stationary nature of the epicardial surface, unlikely to contain the epicardial surface, or any organs beyond that Such a delineation, copied to all subsequent phases will hence contain signals that originate solely from the LV myocardium and LV blood pool. Any motion of the heart may automatically be compensated with (rigid) registration techniques such as motion compensation used for $1^{st}$-pass myocardial perfusion MR image series, as e.g. described in M. Breeuwer, M. Quist, L. Spreeuwers, I. Paetsch, N. Al-Saadi and E. Nagel, "Towards automatic quantitative analysis of cardiac MR perfusion images", Proceedings CARS 2001, June 2001, Berlin, Germany.

Figure 3A:
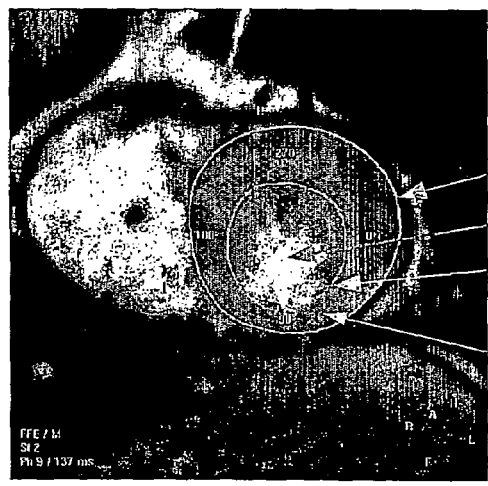
FIG. 3A is a cardiac MR image showing delineated endo- and epicardial walls of the LV myocardium in ES.
Figure 3B:
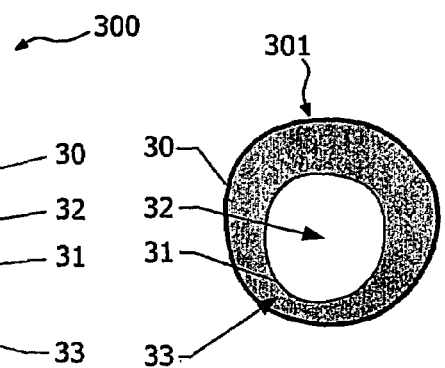
FIG. 3B is a schematic illustration of FIG. 3A.
Figure 4A:
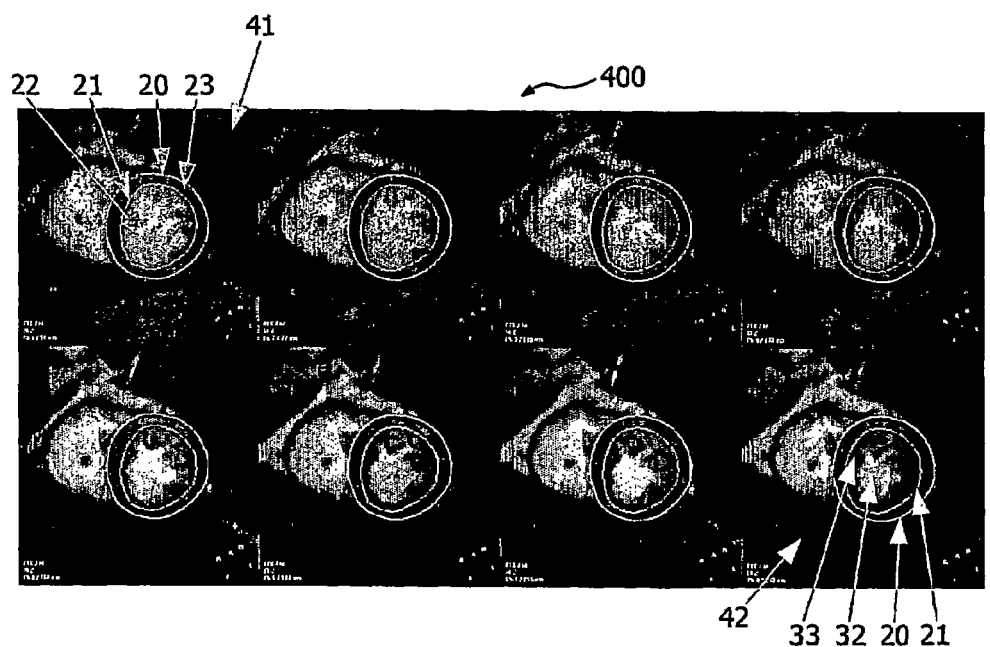
FIG. 4A is a cardiac MR sequence of 8 MR images during the cardiac cycle from ED to ES with delineations of the endocardial and epicardial wall of the LV myocardium derived at ED and copied to the subsequent phases.
Figure 4B:
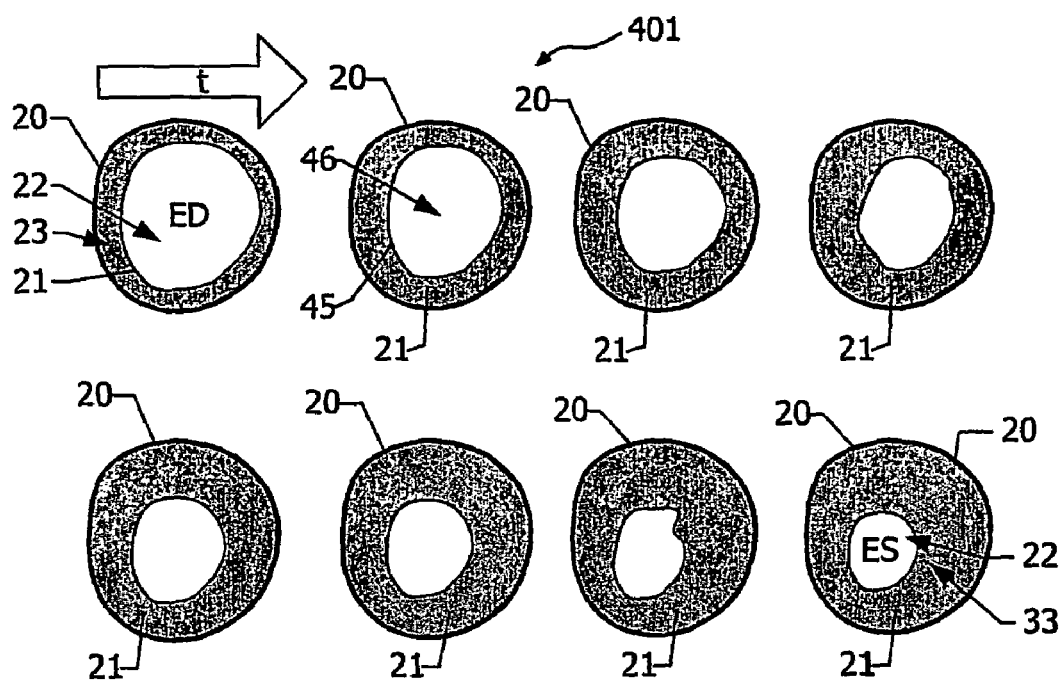
FIG. 4B is a schematic illustration of FIG. 4A.
Figures 2, 8:
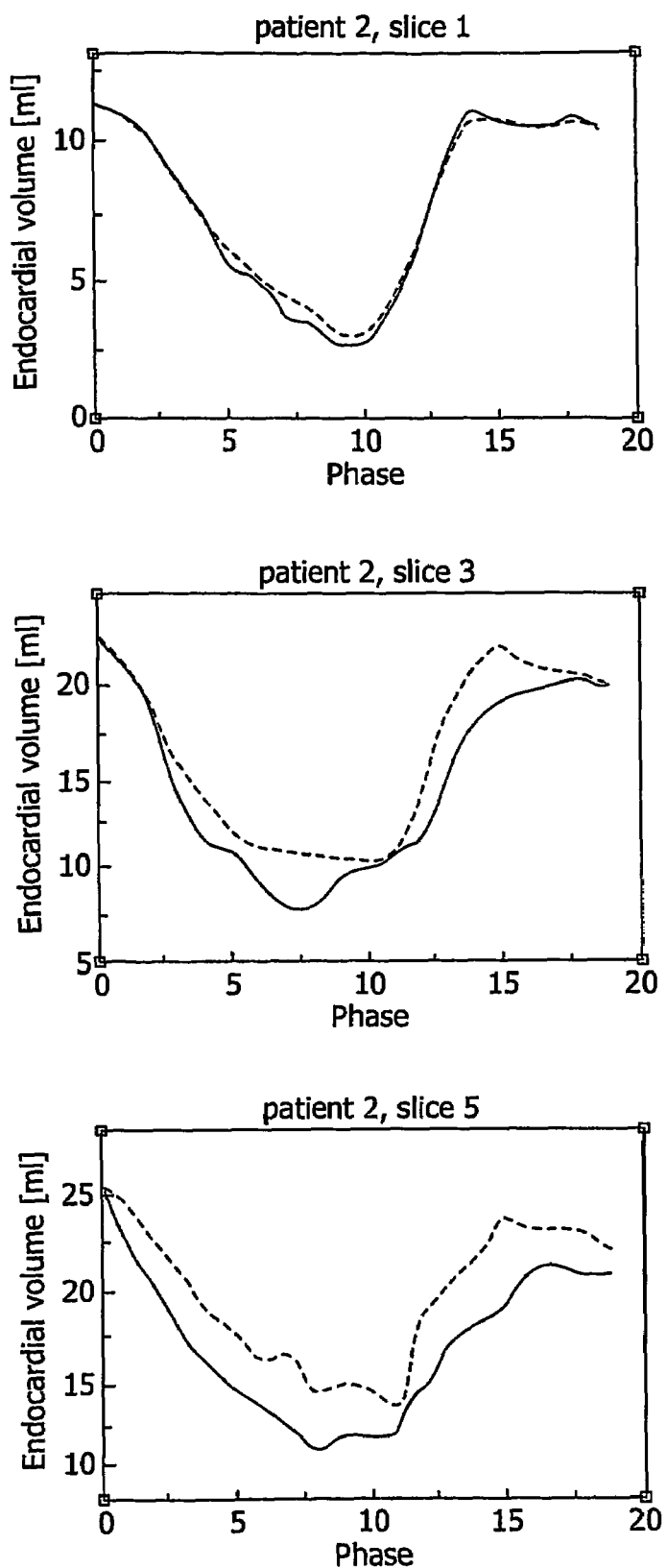
Figures 3, 8:
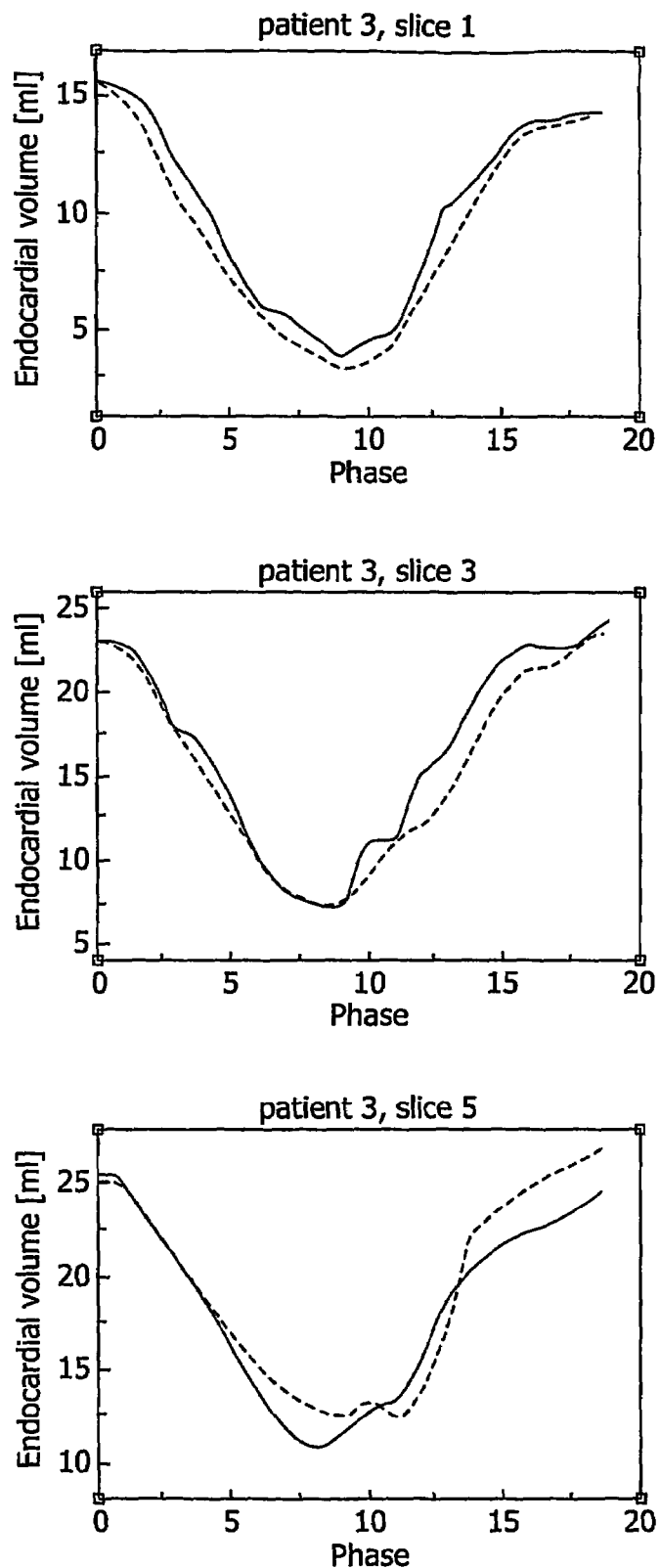
Figures 4, 8:
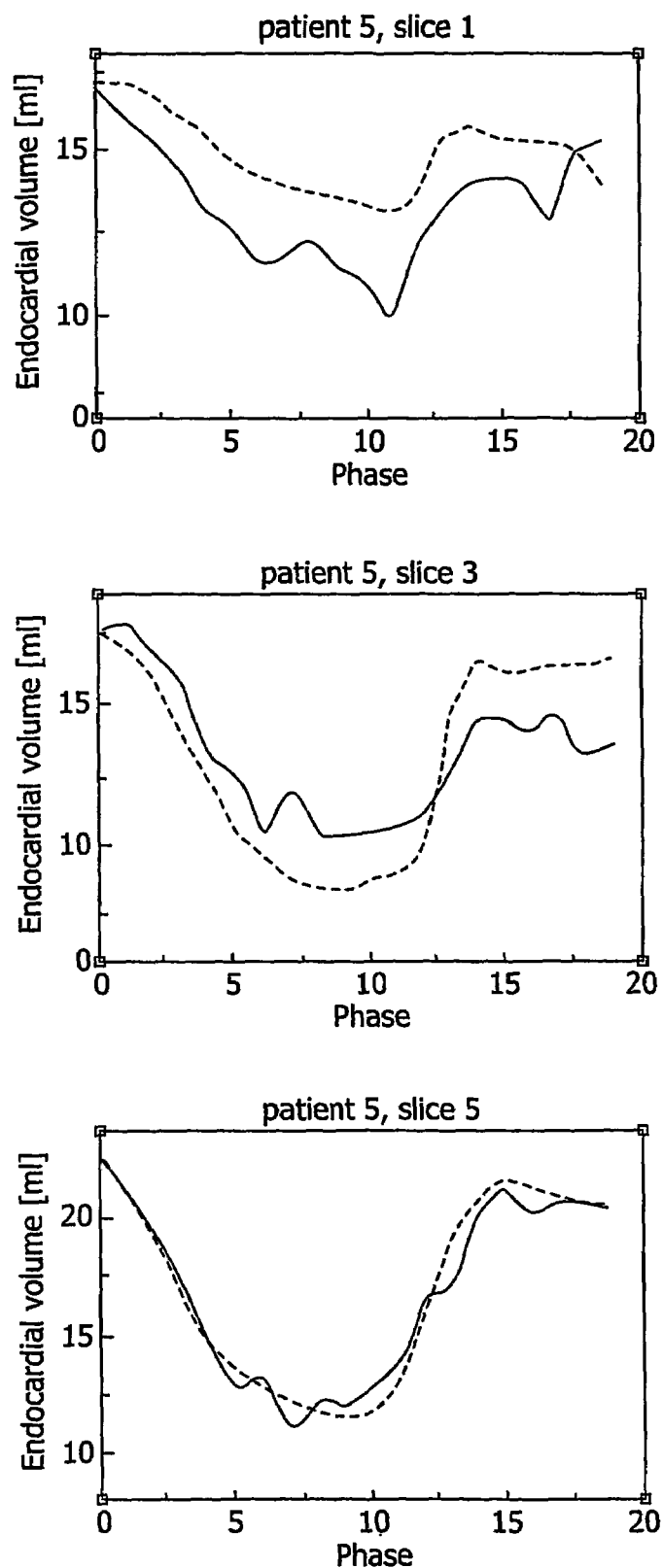
Figures 5, 8:
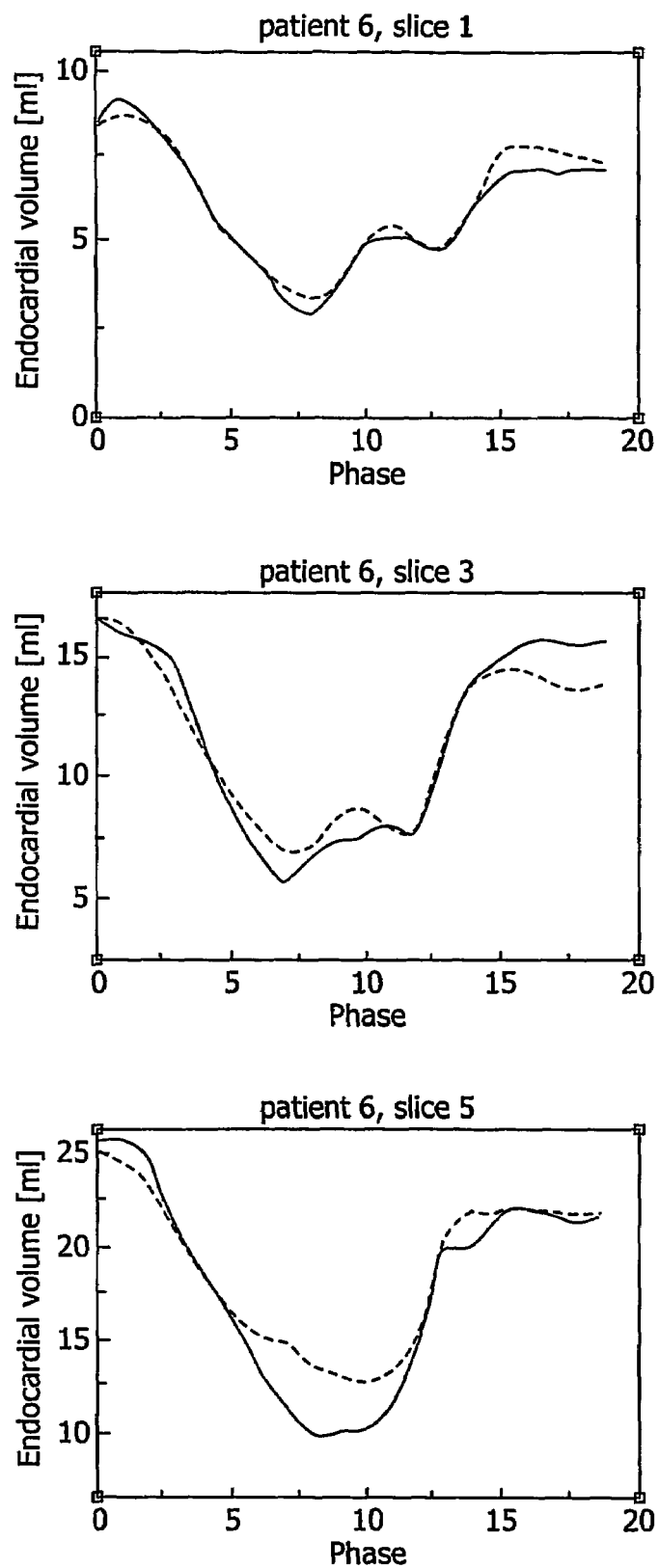

By means of endocardial delineation 21 and epicardial delineation 20 for the first image in the cine series (approximately ED) the mean voxel intensity of myocardium 23 (between delineations 20, 21) is calculated. This is shown in FIGS. 2A and 2B in an exemplary MR image 200 (FIG. 2A) and a corresponding schematic illustration 201 (FIG. 2B) with the LV blood volume 22 inside he endocardial delineation 21. When the endocardial delineation 21 is copied and pasted to subsequent phases (as shown in FIGS. 4A and 4B)

and the contained voxels are integrated, the integral is principally due to the intensities of the blood and the myocardium contained, that is:

$$I_T = I_B + I_{MYO} \quad (1)$$

Where $I_T$ is the total signal intensity, $I_B$ the signal intensity due to the blood and $I_{MYO}$ the signal intensity due to any myocardium that is contained by the contour. As can be seen in FIGS. 3A, 3B and FIGS. 4A, 4B the endocardium moves towards the centroid of the LV blood volume. FIG. 3A is an exemplary MR image 300 (FIG. 3A) and a corresponding schematic illustration 301 is shown in FIG. 3B. The endocardium delineation at ES is delineated with the line 31 indicated in FIGS. 3A and 3B. The LV blood pool at ES is shown at 32. The epicardium delineation 30 at ES is approximately the same as the epicardium delineation 20 at ED. Thus the contribution of the myocardium 23, 33 to the total intensity will increase from ED (image 41 in FIG. 4A) to ES (image 42 in FIG. 4A) and decrease from ES back to ED. Other contributions may arise from the lung, the right ventricular blood pool and epicardial fat. These will only occur if the heart moves sufficiently for these to be covered by the endocardial contour at subsequent phases.

FIGS. 4A and 4B illustrate a cine sequence from ED 41 to ES 42 over time t. FIG. 4A is an exemplary MR cine sequence 400 and a corresponding schematic illustration 401 is shown in FIG. 4B. Line 45 indicates the endocardium boundary at subsequent phases after ED and contains the blood pool 46. The dotted line 21 from ED to ES indicates the endocardium delineation made at ED.

The total area contained by the contour ($A_T$), is equal to the sum of the areas due to the blood ($A_B$) and the myocardium ($A_{MYO}$), such that:

$$A_T = A_B + A_{Myo} \quad (2)$$

These areas are calculated in step 51.

Calculating the mean intensity per voxel, for both myocardium ($S_{MYO}$) and blood ($S_B$), is performed in step 52 of the method, wherein both are calculated from the initial endocardial and epicardial delineations, and assuming that the signal intensity is proportional to the area contained, it is:

$$I_B = A_B \times S_B \quad (3)$$

and $$I_{MYO} = A_{MYO} \times S_{MYO} \quad (4)$$

Solving equations 1, 2, 3 and 4 for the signal intensity due to the blood $I_B$ (equation 5), gives an improved estimate for the integral intensity due to blood. This includes compensation for signal originating from any myocardium that may be present.

$$I_B = \frac{S_B I_T - S_B S_{MYO} A_T}{S_B - S_{MYO}} \quad (5)$$

The total LV volume $V_{LV}$ filled with blood in a certain phase of a CMR cardiac cycle is thus calculated as:

$$V_{LV} = \sum_{i=1}^{n} V_{ED,i} \frac{I_{T,i}}{I_{T,ED}} \quad (6)$$

wherein n is the total number of slices comprising the LV total volume, $V_{ED,i}$ is the calculated volume of slice number i of the LV at end-diastole of the LV, $I_{T,i}$ is the detected intensity of slice i within the endocardial delimitation and $I_{T,ED}$ is the total intensity at ED. This is performed in step 53 of the illustrated method.

Figure 6:
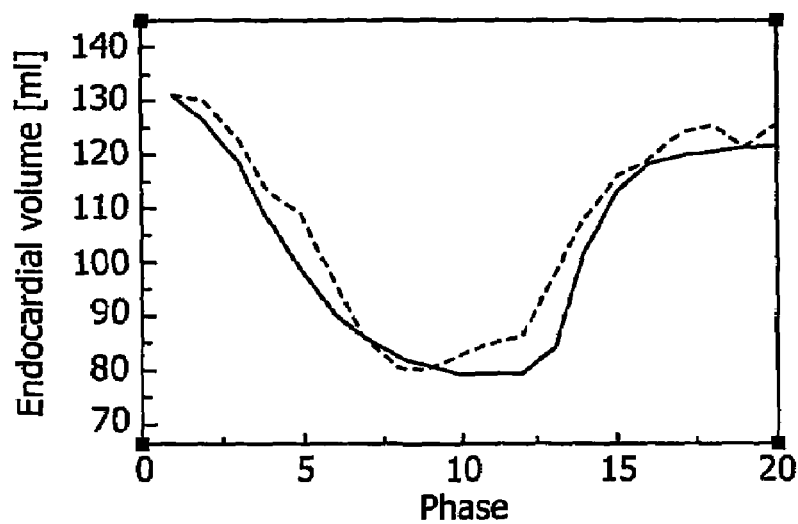
FIGS. 6 and 7 are graphs illustrating the variation of total LV volume during a cardiac cycle calculated according to the method of the invention for two patients compared to manual delineated calculation of the whole sequence.
Figure 7:
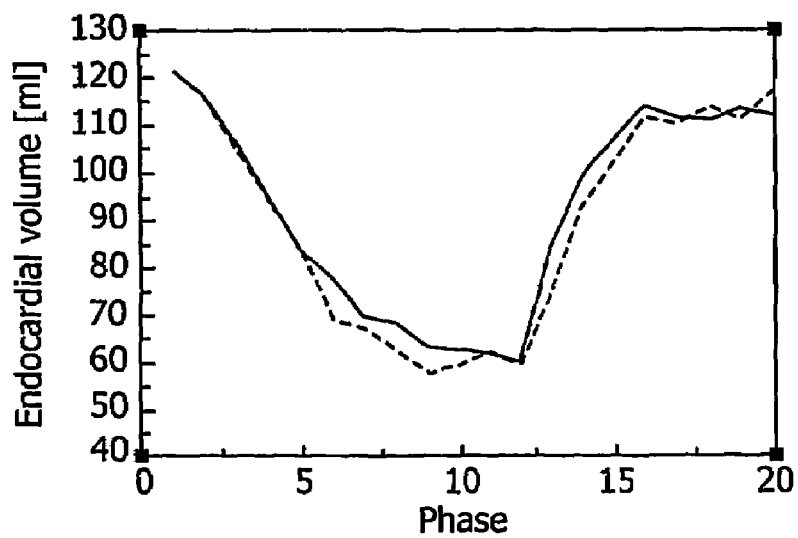

$V_{LV}$ is a function of time t and varies during the cardiac cycle as described above (maximum at ED, minimum at ES). Two examples of calculated $V_{LV}(t)$ are shown as continuous lines in FIGS. 6 and 7. Therefore it is checked in step 54 of the method, if the LV volume has been calculated for all phases of the examined cardiac cycle from the MR cine series. Until all LV volumes for all phases are calculated, the method branches back to step 53, by increasing to the next phase slices in step 55 and calculating (in step 56) the intensities within the copied ED endocardial delineation as described above. In this way the LV volume for all slices is summed up to a total LV volume for each phase, finally resulting in the total LV volume over the whole MR cine series as shown in the graphs in FIGS. 6 and 7.

Clinical studies were performed to validate the method. Short axis electrocardiogram triggered steady state free precession SENSE images were obtained in ten patients undergoing cardiac MRI for the investigation of coronary artery disease. Three slices corresponding to approximately basal, mid and apical positions were selected from 8-9 contiguous slices, imaged with slice thickness 8-10 mm; field of view 350×344-390×390 mm; image size 256×256; 20-25 phases in the cardiac cycle; flip angle 50-55°; TE 1.56-1.68 ms; TR 3.11-3.37 ms. The images were acquired on a Philips Gyrostan Intera 1.5 T with master gradients, using a five-element cardiac synergy coil, and vector electrocardiogram.

For each selected slice, of each image set, both endocardial and epicardial delineations were manually performed on the first image. From these delineations, $A_T$, $S_{MYO}$ and $S_B$ were calculated. For each subsequent image, $I_T$ was calculated by summing the intensity values of all of the voxels contained by the endocardial delineation. $I_B$ was then calculated according to equation 5.

In order to verify the results, manual delineation was performed for every image and the number of voxels contained by that contour calculated. The number of voxels was multiplied by the volume of a single voxel to get a total endocardial volume for each image. The values of $I_B$ were normalised to the endocardial volume in order for them to be plotted on the same axes, by calculating the factor that forces the integral value for the first image to coincide with the volume contained by the manual delineation for that image. This factor was then applied to the intensity sums of all of the images of that slice. Graphs of the values produced can be seen in FIGS. 8-1 to 8-5. These traces follow their manually derived counterparts very well. The smooth nature of the intensity derived traces suggest a more plausible description of cardiac function than the ragged manually derived traces, which is due to the inherent error present in manual delineations.

The graphs in FIGS. 6 to 8-5 show similar shape and features to the volumes produced by the manual delineations.

Further improvements to this method, or at least to the results, may incorporate a delineation of papillary muscles and allow for their subsequent affect on volume measurements. It is anticipated that such a modification would serve to further improve the similarity of the graphs obtained.

Figure 9:
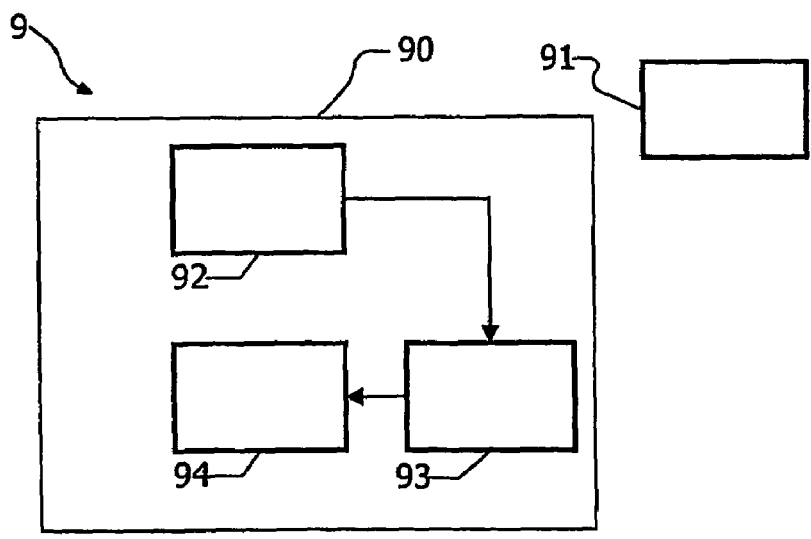
FIG. 9 is a schematic diagram illustrating an embodiment of the computer-readable medium according to the invention.

FIG. 9 shows a schematic diagram over another embodiment 9 of the invention. A computer-readable medium 90 has embodied thereon a computer program for processing by a computer 91 for calculating total left ventricular (LV) volume during a cardiac cycle from a MRI cine series is provided. The computer program comprises a first code segment 92 for delineating endocardial and epicardial contours of a left ventricle in all slices of a MR cine series at end-diastole (ED), a second code 93 segment for applying the endocardial contours delineated at ED to all phases of the cardiac cycle, and a third code segment 94 for calculating the total LV volume based on intensity values inside the endocardial contours delineated at ED. The computer is generally a general purpose computer.

When using MR images, Steady State Free Precession (SSFP) MR images are especially well suited for the LV volume determination according to the invention because the signal intensity of blood in SSFP MR images is approximately constant through out the cardiac cycle.

Apart from the assessment of the LV volume, the method can also be used as a first step in the temporal registration of LV functional images acquired at different stress levels. LV function is usually assessed at a number of (pharmacologically induced) stress levels (4-5 levels). The temporal behaviour of the heart as a function of increasing stress is highly non-linear, which means that the resulting phases cannot simply be matched by linear scaling of the temporal axis. The temporal scaling may be performed using the measured LV volume curves as one of the inputs. In these curves, the contraction and relaxation intervals may for example be determined and these intervals may be matched between the stress levels.

By means of the above described processing of functional cardiac MR (CMR) images, it is possible to determine at what point in the cardiac cycle a certain image was taken. These include: the determination of equivalent images in rest/stress data sets, the identification of ES for the optimisation of registration strategies or the assessment of tachycardia patients.

There are several manners in which one could derive such phase information, the two principle manners from which one might determine the phase are, from a simultaneously recorded ECG signal, or from the actual image data. An alternative, although extremely invasive method, would be via an analysis of the measurements taken by an intra-ventricular pressure catheter. According to an embodiment of the invention, the determination of phase in the cardiac cycle is performed via analysis of the MRI cine image series.

The most obvious and most frequently used image derived method of determining phase, is via manual observation of the cine series. Alternatively, an analysis of the volume contained by delineations of the left ventricular endocardial surface can be performed. This has been used to identify end-diastole and end-systole in the commercially available MASS package (Version 4.2, Medis, Leiden, the Netherlands). However, although the ED and ES phases are identified, where a representation of the entire cardiac cycle is required, linear interpolation between these points has been performed.

A set of endocardial delineations, whether manually, or automatically produced contain sufficient data to perform a detailed analysis of the phase in the cardiac cycle. Currently, automatic delineation techniques encounter difficulties when delineating as described above.

For those imaging modalities that show the myocardium brighter than the left ventricular blood pool an pre-processing step is to invert the images before applying the LV volume measurement method according to the invention.

The method according to the invention is generally implemented on a general purpose computer. However, the method may also be implemented in dedicated solutions, such as code segments for execution by e.g. a DSP chip, a specifically designed integrated circuit such as an ASIC, etc.

The present invention has been described above with reference to specific embodiments. However, other embodiments than the preferred above are equally possible within the scope of the appended claims, e.g. different ways of delineating the endocardial and epicardial contours than those described above, different ways of capturing the cine series, different ways of calculating intensities in the cine images, different slice thickness of the cine images, different number of phases/images representing the cardiac cycle, performing the above method by hardware or software, other image capturing devices or methods for acquiring the cardiac cine series, etc.

Furthermore, the term "comprises/comprising" when used in this specification does not exclude other elements or steps, the terms "a" and "an" do not exclude a plurality and a single processor or other units may fulfil the functions of several of the units or circuits recited in the claims.

The invention claimed is:

1. A method of determining total left ventricular (LV) interior volume during a plurality of phases of a cardiac cycle, said method comprising:
    acquiring a series of cardiac cine images with an imaging device for imaging interior portions of a mammal body including an end-diastole cardiac image at an end-diastole (ED) phase of the cardiac cycle and at least a second cardiac image at a second phase of the cardiac cycle, the second phase being different from the end-diastole phase;
    delineating at least one of endocardial and epicardial contours of a left ventricle (LV) in the end-diastole cardiac image
    calculating an end-diastole interior volume of the left ventricle (LV) in the end-diastole (ED) phase;
    calculating an end-diastole phase intensity value ($I_{T,ED}$) inside the at least one of the endocardial and epicardial contours of the end-diastole cardiac image;
    applying the at least one of the endocardial and epicardial contours delineated for the end-diastole (cardiac) image to the second cardiac image;
    calculating a second phase intensity value for a region of the second cardiac image inside at least one of the end-diastole phase and endocardial contours applied to the second cardiac image;
    calculating a left ventricular interior volume in the second cardiac phase by weighting the end-diastole interior volume in accordance with a ratio of the second phase intensity value and the end-diastole phase ($I_{T,ED}$) intensity value; and
    at least one of storing the left ventricular (LV) interior volume in computer memory and displaying the end-diastole and second cardiac images.

2. The method according to claim 1, wherein the series of cine images is a short-axis study of a heart including multiple slices covering at least the left ventricle and multiple phases within the cardiac cycle.

3. The method according to claim 1, further comprising determining the LV volume from another series of cine images acquired at different stress level, whereby the temporal behaviour of a heart as a function of increasing stress is determined.

4. The method according to claim 1, wherein said device for imaging inside parts of a mammal body is a Magnetic Resonance (MR), Computer Tomography (CT), Nuclear Medicine (NM) or Ultrasound (US) device.

5. The method according to claim 4, wherein an MRI study comprises Steady State Free Precession (SSFP) images.

6. The method according to claim 1, further comprising compensating for heart motion during the acquisition of the series of cine images.

7. A computer-readable medium having stored thereon a computer program controlling a computer to perform the method according to claim 1.

8. The computer-readable medium according to claim 7, wherein a first code segment of the program automatically delineates the endocardial and epicardial contours.

9. The computer-readable medium of claim 7, wherein a code segment of the program calculates the total LV volume by:
dividing a first slice intensity value ($I_{T,i}$) associated with a first slice by the total ED intensity value ($I_{T,ED}$) to form a first fraction intensity value;
multiplying the first fraction intensity value with a calculated interior volume of the first slice of the LV at the ED to form a first slice volume of slice volumes; and
summing the slice volumes to form the total LV interior volume.

10. The computer-readable medium of claim 7, further comprising:
a code segment for calculating an end-diastole cardiac image volume based on a signal intensity due to blood contained in an image surrounded by a manual contour formed by manually delineating an endocardial contour on the image;
another code segment for forcing the end-diastole image volume to coincide with the manual contour using a calculated factor; and
a further code segment for applying the calculated factor to intensity sums of a corresponding slice of a second cardiac image.

11. The method of claim 1, further including:
deleting a contribution of a myocardium enclosed in the endocardial and epicardial contours.

12. The method of claim 1, further comprising:
manually delineating an endocardial contour on the end-diastole cardiac image of a slice to form a manual contour;
calculating the end-diastole image volume based on a signal intensity due to blood contained in the image; and
forcing the end-diastole image volume to coincide with the manual contour using a calculated factor; and
applying the calculated factor to intensity sums of a corresponding slice of the second cardiac image of the slice.

13. A method of determining total left ventricular (LV) interior volume during a cardiac cycle, said method comprising the steps of:
acquiring a cardiac cine series with an imaging device;
delineating endocardial and epicardial contours of a left ventricle in all slices of said cardiac cine series at end-diastole (ED),
calculating a total ED intensity value ($I_{T,ED}$) inside at least one of the contours at the ED,
applying the contours delineated at ED to all phases of the cardiac cycle, and
calculating the total LV interior volume based on (1) intensity values for each of the phases inside the endocardial contours delineated at ED and applied to all the phases, and (2) the total ED intensity value ($I_{T,ED}$),
wherein the total LV interior volume ($V_{LV}$) is calculated as $$V_{LV} = \sum_{i=1}^{n} V_{ED,i} \frac{I_{T,i}}{I_{T,ED}},$$

wherein
n is a total number of slices comprising the LV total interior volume,
$V_{ED,i}$ is a calculated volume of slice number i of the LV at the end-diastole of the LV,
$I_{T,i}$ is a detected intensity of slice i within the endocardial contour; and
at least one of storing the total or end-diastole left ventricular (LV) interior volume in computer memory and displaying an image depicting the total or end-diastole LV interior volume.

14. The method according to claim 13, further comprising calculating a mean intensity for myocardium and blood voxels at ED based on the delineated endocardial and epicardial contours.

15. The method according to claim 14, further comprising using the mean intensities for compensating myocardium enclosed in the endocardial contours delineated at ED during subsequent phases of the cardiac cycle.

16. A method of determining total left ventricular (LV) interior volume during a cardiac cycle, said method comprising the steps of:
acquiring a cardiac cine series with an imaging device;
delineating endocardial contours of a left ventricle in all slices of said cine series at end-diastole (ED),
applying the endocardial contours delineated at the ED to image slices of a selected phase of the cardiac cycle, calculating the total LV interior volume of the selected phase based on phase intensity values inside the endocardial contours delineated at the ED and applied to the image slices of the selected phase;
calculating total ED intensity value ($I_{T,ED}$) inside at least one of the endocardial contours at the ED;
calculating a LV interior volume in the selected cardiac phase by weighting an ED interior volume by a ratio of the phase intensity value ($I_T$) at the selected phase and the total ED intensity value ($I_{T,ED}$);
at least one of storing the left ventricular (LV) interior volume in the selected cardiac phase in computer memory and displaying an image depicting the LV in the selected cardiac phase.

17. The method of claim 16, wherein the calculating steps includes the steps of:
dividing a first slice intensity value ($I_{T,i}$) of the phase intensity values associated with a first slice by the total ED intensity value ($I_{T,ED}$) to form a first fraction intensity value;
multiplying the first fraction intensity value with a calculated interior volume of the first slice of the LV at the ED to form a first slice volume of slice volumes; and
summing the slice volumes to form the total LV interior volume.

18. The method of claim 16, further comprising the steps of:
manually delineating an endocardial contour on the end-diastole cardiac image of a slice to form a manual contour;
calculating the end-diastole image volume based on a signal intensity due to blood contained in the image;
forcing the end-diastole image volume to coincide with the manual contour using a calculated factor; and
applying the calculated factor to intensity sums of a corresponding slice of a second cardiac image.

* * * * *